United States Patent [19]
Funayama et al.

[11] Patent Number: 5,391,611
[45] Date of Patent: Feb. 21, 1995

[54] STYRENIC RESIN COMPOSITION

[75] Inventors: Michio Funayama; Shinichi Miura, both of Ichihara; Masami Mihara, Sodegaura; Keiji Takamatsu, Ichihara, all of Japan

[73] Assignee: Idemitsu Kosan Co., Ltd., Tokyo, Japan

[21] Appl. No.: 140,065

[22] PCT Filed: Mar. 3, 1993

[86] PCT No.: PCT/JP93/00268
§ 371 Date: Nov. 4, 1993
§ 102(e) Date: Nov. 4, 1993

[87] PCT Pub. No.: WO93/18087
PCT Pub. Date: Sep. 16, 1993

[30] Foreign Application Priority Data
Mar. 4, 1992 [JP] Japan .................................. 4-046901

[51] Int. Cl.$^6$ ..................... C08L 25/04; C08L 25/10; C08L 71/12
[52] U.S. Cl. ..................................... 524/508; 525/68; 525/70; 525/88; 525/92; 524/127
[58] Field of Search ....................... 525/88, 92, 68, 70; 524/508, 127

[56] References Cited

U.S. PATENT DOCUMENTS

| | | | |
|---|---|---|---|
| 4,946,897 | 8/1990 | Albizzati et al. | 526/346 |
| 5,164,479 | 11/1992 | Funaki et al. | 526/347.2 |
| 5,183,871 | 2/1993 | Yamasaki et al. | 526/347.2 |
| 5,219,940 | 6/1993 | Nakano | 525/133 |
| 5,292,587 | 3/1994 | Furaki et al. | 526/347.2 |

FOREIGN PATENT DOCUMENTS

| | | |
|---|---|---|
| 0318793 | 11/1988 | European Pat. Off. . |
| 0384208 | 2/1990 | European Pat. Off. . |
| 0442180 | 2/1990 | European Pat. Off. . |
| 62-257950 | 11/1987 | Japan . |
| 1-182344 | 7/1989 | Japan . |
| 1-245052 | 9/1989 | Japan . |
| 1-279944 | 11/1989 | Japan . |

Primary Examiner—James J. Seidleck
Assistant Examiner—Thomas Hamilton, III
Attorney, Agent, or Firm—Oblon, Spivak, McClelland, Maier & Neustadt

[57] ABSTRACT

There is disclosed a styrenic resin composition comprising (A) a styrenic polymer having high degree of syndiotactic configuration and (B) a rubbery polymer having a product of weight-average molecular weight and styrenic monomer unit content being at least 30,000.

The above composition is excellent in release properties, impact resistance, heat resistance, mechanical strength and flame retardancy.

11 Claims, No Drawings

STYRENIC RESIN COMPOSITION

TECHNICAL FIELD

The present invention relates to a styrenic resin composition. More particularly, it pertains to a styrenic resin composition which has favorable release properties from a hot mold, is markedly improved in impact resistance without losing the excellent heat resistance and high mechanical strength that are inherent in a styrenic resin having syndiotactic configuration and, as desired, is gifted with favorable flame retardance.

BACKGROUND ART

Though a styrenic resin has heretofore been widely used in a variety of fields as a general-purpose resin, it has suffered the serious disadvantage of its inferior impact resistance in general. In order to improve the impact resistance of a styrenic polymer, there is industrially produced a so-called rubbery modified styrenic polymer composition, that is, a substantial mixture of a rubbery polymer-styrene graft copolymer and polystyrene in which a part of styrene is graft-polymerized onto a rubbery polymer and the remainder thereof constitutes polystyrene by a method in which styrene is blended with a rubbery polymer or a method in which styrene is polymerized in the presence of a rubbery polymer.

In particular it is known that the impact strength of a styrenic resin composition is enhanced by the use of a perfectly block-type styrene/butadiene copolymer or a taper block-type styrene/butadiene copolymer. For example, there are disclosed an impact-resisting polystyrene in which a perfect block-type styrene/butadiene copolymer is used as the rubbery polymer (refer to Japanese Patent Application Laid-Open No. 165413/1988) and an impact-resisting polystyrene in which a taper block-type styrene/butadiene copolymer is used as the rubbery polymer (refer to Japanese Patent Application Laid-Open Nos. 71549/1977 and 48317/1988).

However, it can not be said that the above-disclosed impact-resisting styrenic resin is always sufficient in the balance among impact resistance, heat resistance, mechanical strength, etc., and thus a styrenic resin which is highly balanced in the aforesaid properties is desired according to the purpose of use thereof.

Being produced by radical polymerization, the generally used styrenic resin is of atactic configuration in its stereoregularity and noncrystalline. Accordingly it can not be said that such styrenic resin is sufficiently high in impact resistance and mechanical strength, thus limiting the improvement in these properties.

In order to develop a styrenic resin composition which has further excellent properties beyond the limit of the improvement in properties inherent in the conventional styrenic resin, the group of the present inventors continued research and proposed a highly impact-resistant styrenic resin composition which comprises a styrenic polymer having high degree of syndiotactic configuration compounded with a rubbery polymer having a styrenic unit as one component (Refer to Japanese Patent Application Laid-Open No. 146944/1989).

Nevertheless, since there has been used in the above-mentioned composition, a rubbery polymer having a product of weight-average molecular weight and styrenic monomer unit content of less than 30,000, the composition has suffered the disadvantages that it brings about a decrease in rigidity at the time of molding presumably attributable to poor dispersion of the rubber and insufficient release properties; and besides the molding produced therefrom is not sufficiently improved in Izod impact strength with low heat resistance (Vicat softening point).

DISCLOSURE OF THE INVENTION

It is an object of the present invention to provide a styrenic resin composition which has favorable release properties from a hot mold which are the conditions of promoting crystallization and is greatly improved in impact resistance without losing the excellent heat resistance and high mechanical strength that are inherent in a styrenic resin having syndiotactic configuration.

It is another object of the present invention to provide a styrenic resin composition which is gifted with favorable flame retardance in addition to the above-mentioned characteristics.

The present invention provides a styrenic resin composition which comprises 50 to 98% by weight of (A) a styrenic polymer having high degree of syndiotactic configuration and 50 to 2% by weight of (B) a rubbery polymer having a product of weight-average molecular weight and styrenic monomer unit content of at least 30,000; a styrenic resin composition which comprises 100 parts by weight of the mixture of 50 to 98% by weight of the aforesaid component (A) and 50 to 2% by weight of the aforesaid component (B), 0.1 to 50 parts by weight of (C) a polyphenylene ether having a polar group and 1 to 350 parts by weight of (D) a filler surface-treated with a coupling agent; and a styrenic resin composition which comprises 100 parts by weight of the mixture of 50 to 98 % by weight of the aforesaid component (A) and 50 to 2 % by weight of the aforesaid component (B), 0.1 to 50 parts by weight of the aforesaid component (C), 1 to 350 parts by weight of the aforesaid component (D), 3 to 60 parts by weight of (E) a flame retardant and 1 to 15 parts by weight of (F) a flame reatardant aid.

THE MOST PREFERRED EMBODIMENT TO CARRY OUT THE INVENTION

The first composition according to the present invention is a styrenic resin composition which is excellent in release properties, impact resistance, heat resistance and mechanical strength and comprises the above-mentioned components (A) and (B). As the component (A) in the aforementioned composition, a styrenic polymer having high degree of syndiotactic configuration is employed. Here, the styrenic polymer which has high degree of syndiotactic configuration means that its stereochemical structure is of high degree of syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such high degree of syndiotactic configuration as mentioned in the present invention usually means polystyrene, poly(alkylstyrene), poly(halogenated styrene), poly(alkoxystyrene), poly(vinyl benzoate), mixture thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), Poly(isopropylstyrene), and poly(tert-butylstyrene). Poly(halogenated styrene) includes poly(chlorostyrene), poly(bromostyrene), and poly(fluorostyrene), poly(alkoxystyrene) includes poly(methoxystyrene), and poly(ethoxystyrene).

The molecular weight and molecular weight distribution of the styrenic polymer having high degree of syndiotactic configuration as the component (A) are not specifically limited but may be determined according to the purpose of use of the composition to be produced and the like.

The styrenic polymer as the component (A) has a melting point of 260° to 270° C. and heat resistance surpassing superior to that of the conventional styrenic polymer having atactic configuration.

Aside therefrom, the rubbery polymer to be used as the component (B) in the present composition has a styrenic monomer unit and is exemplified by styrene/butadiene block copolymer rubber, styrene/butadiene block copolymer in which the butadiene moiety is hydrogenated in part or in whole (SEBS), styrene/butadiene copolymer rubber, methyl acrylate/butadiene/styrene copolymer rubber, acrylonitrile/butadiene/styrene copolymer rubber and methyl acrylate/acrylic acid/2-ethylhexyl-styrene copolymer rubber. Because of its having a styrenic unit, any of the above-exemplified rubbery polymers has favorable dispersibility in the styrenic polymer having high degree of syndiotactic configuration as the component (A) and consequently is remarkably improved in physical properties. The particularly suitable one among them is styrene/butadiene block copolymer in which the butadiene moiety is hydrogenated by at least 95%. A degree of its hydrogenation less than 95% leads to insufficiency in long-term heat resistance of the composition to be produced, thereby causing possibility of coloration or deterioration of the physical properties thereof.

In the rubbery polymer as the component (B) in the present invention, the product of weight-average molecular weight (Mw) and styrenic monomer unit content (Cst)—(Mw×Cst) is at least 30,000, preferably 40,000 to 200,000. A product thereof less than 30,000 results in insufficient release properties and rigidity as well as inferior heat resistance.

It is necessary that in the present composition, the component (A) and the component (B) be blended in proportions of 50 to 98% by weight and 50 to 2% by weight, respectively, preferably 70 to 95% by weight and 30 to 5% by weight, respectively. A proportion of the component (B) less than 2% by weight results in insufficient effect on improving the impact resisitance, whereas that more than 50% by weight causes remarkable decrease in modulus of elasticity.

The second composition according to the present invention is a styrenic resin composition which is highly balanced in release properties, impact resistance, heat resistance and mechanical strength and which comprises the mixture of 50 to 98% by weight of the aforesaid component (A) an 50 to 2% by weight of the aforesaid component (B), a polyphenylene ether having a polar group as the component (C) and a filler surface-treated with a coupling agent as the component (D).

Examples of the polar group in the polyphenylene ether having a polar group as the aforementioned component (C) include acid halide, carbonyl group, acid anhydride, acid amide, carbonic acid ester, acid azide, sulfone group, nitrile group, cyano group, isocyanic acid ester group, amino group, hydroxyl group, imide group, thiol group, oxazoline group and epoxy group, of which an acid anhydride is particularly desirable, among which maleic anhydride group is most desirable. The content of the polar group should be not less than 0.01% by weight based on the polyphenylene ether. A content thereof less than 0.01% by weight makes it impossible to expect the improvement in mechanical strength.

The polyphenylene ether having a polar group can be produced, for example, by (1) a method wherein a polyphenylene ether is reacted with a compound having both the above-mentioned polar group and an unsaturated group, (2) a method wherein at least one phenolic compound having the above-mentioned polar group is polymerized, (3) a method wherein at least one phenolic compound having the above-mentioned polar group is polymerized with a phenolic compound not having a polar group or the like method.

A polyphenylene ether is a publicly known compound in itself (refer to U.S. Pat. Nos. 3306874, 3306875, 3257357 and 3257358), and is produced usually by oxidative coupling reaction forming a homopolymer or a copolymer in the presence of a cupramine complex and at least one di-or-tri-substituted phenol. As the cupramine complex, there may be employed the cupramine complex derived from any of primary, secondary and tertiary amines.

Specific examples of the suitable polyphenylene ether include poly(2,3-dimethyl-6-ethyl-1,4-phenylene ether), poly(2-methyl-6-chloromethyl-1,4-phenylene ether), poly(2-methyl-6-hydroxyethy-1,4-phenylene ether), poly(2-methyl-6-n-buthyl-1,4-phenylene ether), poly(2-ethyl-6-isopropyl-1,4-phenylene ether), poly(2-ethyl-6-isopropyl-1,4-phenylene ether), poly(2,3,6-trimethyl-1,4-phenylene ether), poly[2-(4'-methylphenyl)-1,4-phenylene ether], poly(2-bromo-6phenyl-1,4-phenylene ether), poly(2-methyl-6-phenyl-1,4-phenylene ether), poly(2-ethyl-1,4-phenylene ether), poly(2-chloro-1,4-phenylene ether), poly(2-methyl-1,4-phenylene ether), poly(2-chloro-6-éthyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6dibromo-1,4-phenylene ether), poly(2,6-dichloro-1,4-phenylene ether), poly (2,6-diethyl-1,4-phenylene ether) and poly(2,6-dimethyl-1,4-phenylene ether). Other suitable examples of the polyphenylene ether include a copolymer derived from at least two phenolic compounds that are used for the preparation of the above-mentioned homopolymer and a graft copolymer or a block copolymer of an aromatic vinyl compound such as styrene and the aforestated polyphenylene ether. Among the above-mentioned polyphenylene ether, poly(2,6-dimethyl-1,4-phenylene ether) is particularly desirable for use.

The above-mentioned compound having both a polar group and an unsaturated group is a compound having in the same molecule both an unsaturated group such as carbon-carbon double bond and carbon-carbon triple bond, and a polar group such as carboxyl group, a group derived from a carboxylic acid exemplified by various salts and esters formed by replacement of hydrogen atom or hydroxyl group of carboxyl group, acid amide, acid anhydride, imide, acid azide, halogenated acid, oxazoline, nitrile, epoxy group, amino group, hydroxyl group and isocyanic acid ester.

Major examples of the compound having both a polar group and an unsaturated group include unsaturated carboxylic acid, derivative thereof, unsaturated epoxy compound, unsaturated alcohol, unsaturated amine and unsaturated isocyanic acid ester, specifically exemplified by maleic anhydride, maleic acid, fumaric acid, maleimide, maleic hydrazide and a reaction product of maleic acid and diamine represented by, for example, the constitutional formula

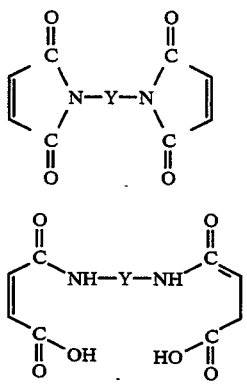

wherein R is an aliphatic or aromatic group, methylnadic anhydride, dichloromaleic anhydride; maleic amide; itaconic acid; and itaconic anhydride, natural fat and oil such as soybean oil; tung oil; castor oil; linseed oil; hempseed oil; cotton seed oil; sesame oil; rapeseed oil; peanut oil; camellia oil; olive oil; coconut oil; and sardine oil, unsaturated carboxylic acid such as acrylic acid; butenoic acid; crotonic acid; vinylacetic acid; methacrylic acid; pentenoic acid; acgelic acid; thebenolic acid; 2-pentenoic acid; 3-pentenoic acid; α-ethylacrylic acid; β-methylcrotonic acid; 4-pentenoic acid; 2-hexenoic acid; 2-methyl-2-pentenoic acid; 3-methyl-2-pentenoic acid; α-ethylcrotonic acid; 2,2- dimethyl-3-butenoic acid; 2-heptenoic acid; 2-octenoic acid; 4-decenoic acid; 9-undecenoic acid; 10-undecenoic acid; 4-dodecenoic acid; 5-dodecenoic acid; 4-tetradecenoic acid; 9-tetradecenoc acid; 9-hexadecenoic acid; 2-octadecenoic acid; 9-octadecenoic acid; eicosenoic acid; docosenoic acid; erucic acid; tetracosenoic acid; myelibainic acid; 2,4-pentadienoic acid; 2,4-hexadienoic acid; diallylacetic acid; geranic acid; 2,4-decadienoic acid; 2,4-dodecadienoic acid; 9,12-hexadecadienoic acid; 9,12-octadecadienoic acid; hexadecatriolefinic acid; linolic acid; linolenic acid; octadecatriolefinic acid; eicosadienoic acid; eicosatriolefinic acid; eicosatetraolefinic acid; ricinolic acid; eleostearic acid; oleic acid; eicosapentaenoic acid; erucinoic acid; docosadienoic acid; docosatriolefinic acid; docosatetraolefinic acid; docosapentaenoic acid; tetracosenoic acid; hexacosenoic acid; hexacodienoic acid; octacosenoic acid; and tetracosenoic acid, and esters thereof, acid amide thereof, anhydride thereof, unsaturated alcohol such as allyl alcohol; crotyl alcohol; methylvinyl carbinol; allyl carbinol; methylpropenyl carbinol; 4-pentene-1-ol; 10-undecane-1-ol; propargyl alcohol; 1,4-pentadiene-3-ol; 1,4-hexadiene-3-ol; 3,5-hexadiene-2-ol; 2,4-hyexadiene-1-ol; alcohol represented by the General formula $C_nH_{2n-5}OH$, $C_nH_{2n-7}OH$ or $C_nH_{2n-9}OH$ wherein n denotes a positive integer; 3-butene-1,2-diol; 2,5-dimethyl-3-hexene-2,5-diol; 1,5-hexadiene-3,4-diol; and 2,6-octadiene-4,5-diol, unsaturated amine derived from unsaturated alcohol by substituting $NH_2$ group for OH group, adduct of low polymer, e,g. with an average molecular weight of 500 to 10000, approxy, or adduct of high polymer, e,g. with an average molecular weight of 10,000 or more derived from butadiene, isoprene, etc. with maleic anhydride, phenols of the like; above adduct into which amino group; carboxyl group; hydroxyl group, epoxy group or the like is introduced; and allyl isocyanate.

Examples of vinyl compound having an epoxy group include glycidyl methacrylate; glycidyl acrylate; vinylglycidyl ether;glycidyl ether of hydroxyalkyl (meth)acrylate; glycidyl ether of polyalkyleneglycol (meth)acrylate and glycidyl itaconate, of which glycidyl methacrylate is particularly desirable.

The method of reacting the compound having both a polar group and an unsaturated group with the above-mentioned polyphenylene ether is exemplified by (1) a method wherein a compound having both a polar group and an unsaturated group and a polyphenylene ether are melt-kneaded at a temperature of 150° to 350° C. by the use of a roll mill, a Banbury mixer, an extruder or the like to allow them to react with each other and (2) a method wherein a polyphenylene ether and a compound having both a polar group and an unsaturated group are reacted by heating in a solvent such as benzene, toluene and xylene. It is effective for ready proceeding of the reaction to allow an organic peroxide such as benzoyl peroxide, di-tert-buthyl peroxide, dicumyl peroxide and tert-butylperoxybenzoate and/or a radical reaction initiator typified by an ago compound such as azobis(isobutyronitrile) and azobis(isovaleronitrile) to exist in the raction system. More effective method is a method by melt kneading the components in the presence of a radical reaction initiator.

It is necessary that the polyphenylene ether having a polar group as the component (C) be blended in an amount of 0.1 to 50 parts, preferably 0.1 to 10 parts by weight based on 100 parts by weight of the mixture of 50 to 98% by weight of the component (A) and 50 to 2% by weight of the component (B). An amount thereof less that 0.1 part by weight results in failure to sufficiently exhibit the effect on improving the mechanical strength of the composition to be produced, whereas that more than 50 parts by weight leads to a low crystallization rate, thereby causing decrease in productivity due to unfavorable mold release and increase in the cooling time.

The polyphenylene ether having a polar group as the component (C) need not be prepared in advance, but may be prepared by mixing the components (A) and (B), polyphenylene ether, a compound having both a polar group and an unsaturated group and a filler surface-treated with a coupling agent as the component (D) hereinafter described prior to the preparation of the resin composition, and melt-kneading the resultant blend at 150° to 350° C. by the use of a roll mill, a Banbury mixer, an extruder or the like.

In the above-mentioned composition, a filler surface-treated with a coupling agent is used as the component (D). The filler is not specifically limited in its form or shape, but may be in the form of fiber, granule or powder. Examples of fibrous filler include glass fiber, carbon fiber, organic synthetic fiber, whisker, ceramics fiber, metallic fiber and natural vegetable fiber. Specific examples of the filler include totally aromatic polyamide fiber and polyimide fiber as organic synthetic fiber, boron; alumina; silica; and silicon carbide as whisker, gypsum; potassium titanate; magnesium sulfate; and magnesium oxide as ceramics fiber, copper; aluminum; and steel as metallic fiber. Among them are particularly desirable glass fiber and carbon. The form or shape of the filler includes cloth, mat, bound and cut fiber, short fiber, filament and whisker. The bound and cut fiber has preferably a length of 0.05 to 50 mm and a diameter of 5 to 20 μm. As carbon fiber, that of polyacrylonitrile-based (PAN) is preferable.

Examples of granular or powdery filler include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metallic powder, glass powder, glass flake and glass bead. Among them, talc, calcium carbonate and mica are preferable in particular. Talc has desirably an average grain size of 0.3 to 20 μm, more desirably 0.6 to 10 μm. Calcium carbonate has desirably an average grain size of 0.1 to 20μ m. Talc has desirably an average grain size of 40 to 250μm, more-desirably 50 to 150 μm. Particularly desirable fillers among them include glass filler such as glass powder, glass flake, glass beads, glass filament, glass fiber, glass roving and glass mat.

The purpose of a coupling agent to be used for the surface treatment of aforestated filler is to improve the adhesivity between the filler and the polyphenylene ether having a polar group as the component (C). The coupling agent may be optionally selected for use from the publicly known silane-based coupling agent and titanium-based coupling agent. Examples of the silane-based coupling agent include triethoxysilane, vinyltris(β-methoxyethoxy)silane, γ-methacryloxypropyltrimethoxysilane, γ-glycidoxypropyltrimethoxysilane, β-(1,1-epoxycyclohexyl)ethyltrimethoxyysilane, n-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-aminopropyltrimethoxysilane, γ-aminopropyl-tris(2-methoxyethoxy)silane, N-methyl-γ-aminopropyl-trimethoxysilane, N-vinylbenzyl-γ-aminopropyl-triethoxysilane, triaminopropyltrimethoxysilane, 3-ureidopropyltrimethoxysilane, 3-4,5-dihydroimidazolepropyltriethoxysilane, hexamethyldisilazane, N,O-(bistrimethylsilyl)amide and N,N-bis(trimethylsilyl)urea. Among them are desirable aminosilane and epoxysilane such as γ-aminopropyltriethoxysilane, N-β-(aminoethylo)-γ-aminopropyltriethoxysilane, γ-glicidoxypropyltrimethoxysilane, β-(3,4epoxycyclohexyl)ethyltrimethoxysilane. Among them the above-mentioned amino silanes are particularly desirable.

Specific examples of the titanium-based coupling agent include isopropyltriisostearoyl titanate, isopropyltridodecylbenzenesulfonyl titanate, isopropyltris(dioctylpyrophosphate) titanate, tetraisopropylbis(dioctylphosphite) titanate, tetraoctylbis(di-tridecylphosphite) titanate, tetrta(1,1-diallyloxymethyl-1-butyl)bis(di-tridecyl)phsphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacrylate titanate, isopropyltri(dioctylphosphate) titanate, isopropyltricumylphenyl titanate, isopropyltri(N-amidoethylaminoethyl) titanate, dicumylphenyloxyacetate titanate and di-isostearoyl-ethylene titanate, among which isopropyltri(N-amidoethylaminoethyl) titanate is desirable.

The surface treatment of the above-mentioned filler by the use of such coupling agent can be effected by a conventional known method without specific limitation, for example, sizing treatment in which the filler is coated with the sizing agent in the form of solution of the coupling agent as mentioned above in an organic solvent or in the form of suspension containing the coupling agent; dry blending by the use of a Henschel mixer, super mixer, Ready-gel mixer, V-type blender or the like; spraying method; integral blending; dry concentration or the like, each being suitably selected according to the form and shape of the filler to be used. The surface treatment is, however, preferably carried out by means of sizing treatment, dry blending, spraying or the like.

In combination with the aforementioned coupling agent, a film forming substance for glass may be used without specific limitation and is exemplified by the polymer such as polyester-based, urethane-based, epoxy-based, acrylics-based, vinyl acetate-based and isocyanate-based polymers.

It is necessary in the present invention that the filler surface-treated with a coupling agent as the component (D) be blended in an amount of 1 to 350 parts, preferably 1 to 200 parts by weight based on 100 parts by weight of the mixture of 50 to 98% by weight of the component (A) and 50 to 2% by weight of the comoponent (B). An amount thereof less than 1 part by weight results in failure to sufficiently exert the effect of the filler added, while that more than 350 parts by weight unfavorably leads to poor dispersibility of the filler added, thereby making kneading and molding difficult.

The third composition according to the present invention is a styrenic resin composition which is highly balanced in flame retardance, impact resistance, heat resistance and mechanical properties and which comprises the mixture of 50 to 98% by weight of the component (A) and 50 to 2% by weight of the component (B), 0.1 to 50 parts by weight of the component (C), 1 to 350 parts by weight of the component (D), a flame retardant as the component (E) and a flame retardant aid as the component (F).

There are available a variety of flame retardant as the component (E), among which are preferable in particular, a halogen-based flame retardant and a phosphorus-based flame retardant. Examples of the halogen-based flame retardant include tetrabromobisphenol A; tetrabromophthalic anhydride; hexabromobenzene; tribromophenylallyl ether; pentabromotoluene; pentabromophenol; tribromophenyl-2,3-dibromopropyl ether; tris(2,3-dibromopropyl)phosphate; tris(2-chloro-3-bromopropyl)phsphate; octabromodiphenyl ether; decabromodiphenyl ether; octabromobiphenyl; pentachloropentacyclodecane; hexabromocyclododecane; hexachlorobenzene; pentachlorotoluene; hexabromobiphenyl decabromobiphenyl; tetrabromobutane; decabromodiphenyl ether; hexabromodiphenyl ether; ethylenebis(tetrabromophthal-imide); tetrachlorobisphenol A; tetrabromobisphenol A; an oligomer of tetrachlorobisphenol A or tetrabromobisphenol A; halogenated polycarbonate oligomer such as phsphorus-based polycarbonate oligomer; halogenated epoxy compound; polychlorostyrene; brominated polystyrene such as poly(tribromostyrene); poly(dibromophenylene oxide); and bis(tribromophenoxy)ethane.

Aside therefrom, examples of the phsphorus-based flame retardant include ammonium phosphate, tricresyl phosphate, triethyl phsphate, acidic phsphoric acid ester and triphenyl-phosphone oxide. The particularly preferable examples among them are poly(tribromostyrene), poly(dibromophenylene oxide), decabromophenyl ether, bis(tribromophenoxy)ethane, ethylenebis(tetrabromophthalimide), tetrabromobisphenol A and brominated polycarbonate oligomer.

It is necessary that the flame retardant as the component (E) in the composition be blended in an amount of 3 to 60 parts, preferably 5 to 40 parts by weight based on 100 parts by weight of the mixture of 50 to 98% by weight of the component (A) and 50 to 2% by weight of the component (B). An amount thereof less than 3 parts by weight results in sufficient flame retardance of the composition to be produced, whereas that more than 60 parts by weight leads to failure to exhibit the effect on flame retardance corresponding to the amount added and besides to the tendency to impair the mechanical physical properties and chemical resistance.

Examples of the flame retardant aid to be used as the component (F) included antimony-based flame retardant such as antimony trioxide, antimony pentaoxide, sodium antimonate, metallic antimony, antimony trichloride, antimony pentachloride, antimony trisulfide and antimony pentasulfide and futher, zinc borate, barium metaborate and zirconium oxide, of which antimony trioxide is preferable.

The use of either the component (E) or the component (F) can not sufficiently exert the effect on flame retardance. It is necessary that the flame retadant aid as the component (F) in the composition be blended in an amount of 1 to 15 parts, preferably 2 to 10 parts by weight based on 100 parts by weight of the mixture of 50 to 98% by weight of the component (A) and 50 to 2% by weight of the component (B). An amount thereof less than 1 part by weight results in failure to sufficiently exhibit the effect of blending of the same, whereas that more than 15 parts by weight leads to failure to exhibit the effect of blending corresponding to the amount added and besides to the tendency to impair the mechanical physical properties, chemical resistance and practical physical properties such as creep properties.

The resin composition of the present invention may be incorporated as necessary with an additive such as stabilizer, antioxidant, light stabilizer, lubricant, plasticizer, antistatic agent, nucleating agent, colorant or the like or an other thermoplastic resin in addition to the essential component as hereinbefore described in so far as the object of the present invention is not impaired.

As the aforesaid stabilizer, mention may be made of the hydrotalcite represented by the general formula

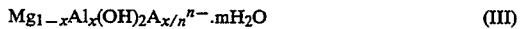

$Mg_{1-x}Al_x(OH)_2A_{x/n}{}^{n-}\cdot mH_2O$ (III)

wherein $A^{n-}$ is an n-valent anion; x is a number satisfying the inequality) $0 < x < 0.5$, preferably $0.2 < x < 0.4$; and m is a number satisfying the inequality $0 < m < 1$. Preferable examples of the n-valent anion represented by $A^{n-}$ in the general formula (III) include $CO_3{}^{2-}$, $HPO_4{}^{2-}$, $SO_4{}^{2-}$ and $OH^-$.

Suitable hydrotalcite among them is that having a BET specific surface area of 30 m²/g or less, desirably 20 m²/g or less, more desirably 15 m²/g or less. Such hydrotalcite is well advanced in crystal grain, small in secondary particle size due to less crystal strain and excellent in dispersibility in a thermoplastic resin without causing the possibility of exerting adverse influence on the physical properties and moldability of the resin composition. Moreover it serves to uniformly exhibit the function of trapping a halogen in the resin composition and does not show unfavorable interaction with an other additive such as yellowing of the resin due to reaction with an antioxidant. Mention may be made of the particle size being preferably 0.1 to 1 μm and the average secondary particle size being preferably 5 μm or smaller, for example, 0.1 to 5 μm, more preferably 1 μm or smaller.

The suitable hydrotalcite in addition to the above is that having grain size of 600 Å or larger, preferably 1000 Å or larger in terms of the grain size in the direction of <003> as determined by X-ray diffraction method. The conventionally available hydrotalcite has a BET specific surface area of 50 m²/g or more, an average secondary particle size of 10 μm or larger and a grain size in the <003> direction of 300 Å or smaller. The hydrotalcite having an excessive BET surface area exceeding 30 m²/g is not so effective. The effective hydrotalcite as the stabilizer is that having a BET specific surface area of 30 m²/g or less, and the particularly effective one is that which has a BET specific surface area of 30 m²/g or less and satisfies the above-mentioned conditions for the secondary particle size and the grain size in the <003> direction.

By means of surface treatment, such hydrotalcite can be further enhanced in compatibility with a resin, dispersibility and coloring properties. The surface treating agent utilized for the surface treatment may be exemplified by anionic surfactant, silane-based coupling agent, titanium-based coupling agent and higher fatty acid ester. The above-mentioned surface treating agent is used usually in an amount of 0.1 to 10 parts by weight per 100 parts by weight of the hydrotalcite.

As the stabilizer in addition to the aforestated hydrotalcite, mention may be made of (a) boric acid, boric anhydride and borate of a metal belonging to the group II or the group IV of the periodic table and (b) zeolite or zeolite containing a metal belonging to the group II or the group IV of the periodic table.

The above-mentioned boric acid and boric anhydride are not specifically limited but are exemplified, as usable one, by orthoboric acid, metaboric acid, tetraboric acid, diboron dioxide, diboron trioxide, tetraboron trioxide and tetraboron pentaoxide. The above-exemplified compound may be employed alone or in combination with at least one of them.

The metal constituting the borate of a metal belonging to the group II or the group IV of the perodic table is not specifically limited, but includes preferably magnesium, calsium, zinc, strontium, barium, zirconium and tin, especially calcium, zinc and barium from the viewpoint of efficiency, toxicity and availability. As the borate of a metal, mention may be made of magnesium borate, calcium borate, zinc borate, strontium borate, barium borate, zirconium borate and tin borate. The above-exemplified compound may be employed alone or in combination with at least one of them.

The zeolite is exemplified preferably by the zeolite of type A as represented by the general formula $$Na_2O \cdot Al_2O_3 \cdot 2SiO_2 \cdot kh_2O \qquad (IV)$$

which may be a natural product or a synthetic product. The zeolite of type A may be that which is surface-treated, for example, with an alkali mtal salt of a higher fatty acid such as an alkali metal salt of stearic acid or oleic acid, an alkali metal salt of an organosulfonic acid such as an alkali metal salt of dodecylbenzenesulfonic acid.

The zeolite containing a metal belonging to the group II or the group IV of the periodic table is the zeolite of type A in which Na is replaced with a metal belonging to the group II or the group IV of the periodic table (hereinafter referred to as "metal-substituted zeolite"). The metal for substitution is not specifically limited, but includes preferably magnesium, calcium, zinc, strontium, barium, zirconium and tin, especially calcium, zinc and barium from the viewpoint of effect, toxicity and availability.

The metal-substituted zeolite is obtained by substituting the above-mentioned metal for part or whole of the alkali metal in a zeolite containing an alkali metal. The metal substitution rate is preferably in a high level, but is usually 10 to 70%, approx. for the easily and industrially available zeolite. Specific examples of the metal-substituted zeolite include magnesium-substituted zeolite, calcium substituted-zeolite, zinc-substituted zeolite, strontium-substituted zeolite, barium-substituted zeolite, zirconium-substituted zeolite and tin-substituted zeolite. Natural zeolite containing any of the metals is also usable. The above-mentioned zeolite may be employed alone or in combination with at least one of them.

The process for producing the zeolite to be employed in the present invention is not specifically limited, but may be a publicly know process (for example, refer to Japanese Patent Application Laid-Open No. 28145/1982).

Examples of the above-mentioned antioxidant include a hindered phenol-based compound such as 2,6-di-tert-butyl-4-methylphenol; stearyl-β-(3,5-di-tert-butyl-4-hydroxyphenol)propionate; and triethylene glycol-bis-3-(3-tert-butyl-4-hydroxy-5-methylphenyl)propionte and a phosphorus-based compound such as tris(2,4-tert-butylphenyl)phosphite; and 4,4'-butylidenebis(3-methyl-6-tert-butylphenyl-di-tridecyl)-phosphite.

As the light stabilizer, a hindered amine-based compound or benzotriazole-based compound is preferebly used. The hindered amine-based compound is preferably a heterocyclic hindered amine compound, which is composed of a six-membered heterocyclic ring containing the nitrogen atom in the hindered amine and a heteroatom as the case may be and preferably a nitrogen or an oxygen atom and is exemplified by di-(2,2,6,6-tetramethyl-4-piperidyl)sebacate; 4-benzoyloxy-2,2,6,6-tetramethylpiperidine; a compound of succinic acid with N-(2-hydroxyethyl)-2,2,6,6-tetramethyl-4-hydroxypiperidine; 1,2,3,4-tetra(2,2,6,6-tetramethyl-4-piperidyl)butane tetracarboxilate; 1,4-di-(2,2,6,6-tetramethyl-4-piperidyl)-2,3-butane-dione; tris(2,2,6,6-tetramethyl-4-piperidyl) trimellitate; 1,2,2,6,6-pentamethyl-4-piperidyl stearate; 1,2,2,6,6-pentamethyl-4-piperidyl n-octoate; bis(1,2,2,6,6-pentamethyl-4-piperidyl)-sebacate; tris(2,2,6,6-tetramethyl-4-piperidyl)nitrile acetate; 4-hydroxy-2,2,6,6-tetramethylpiperidine; and 4-hydroxy-1,2,2,6,6-pentamethylpiperidine. The preferable compounds among them are di-(2,2,6,6-tetramethyl-4-piperidyl)sebacate and the condensate of succinic acid and N-(2-hydroxy-ethyl)-2,2,6,6-tetramethyl-4-hydroxypiperidine.

Examples of the benzotriazole-based compound include (2'-hydroxy-5'-methylphenyl)benzotriazole; 2-(2'-hydroxy-5'-tert-butylphenyl)benzotriazole; 2-(2'-hydroxy-5'-amylphenyl)benzotriazole; 2-(2'-hydroxy-4'-octoxyphenyl)benzotriazole; 2-(2'-hydroxy-3',5'-di-tertbutylphenyl)benzotriazole; 2-(2'-hydroxy-3',5'-diisoamylphenyl)benzotriazole; 2-(2'-hydroxy-3',5'-dimethylphenyl)benzotriazole; 2-(2'-hydroxy-3'-tert-butyl-5'-methylphenyl)-5-chlorobenzotriazole; 2-(2'-hydroxy-3',5'-di-tert-butylphenyl)-5-chlorobenzotriazole; 2-(2'-hydroxy-3',5'-dimethylphenyl)-5-chlorobenzotriazole; and 2-(2'-hydroxy-3',5'-dichlorophenyl)benzotriazole, of which 2-(2'-hydroxy-5'-methylphenyl)benzotriazole is particularly desirable.

Examples of lubricant include stearic acid, behenic acid, zinc stearate, calcium stearate, magnesium stearate and ethylenbisstearamide. Examples of plasticizer include organopolysiloxane and mineral oil.

Examples of the other thermoplastic rein include polyphenylene ether without a polar group, polyolefin such as polyethylene; polypropylene; polybutene; and polypentene, polyester such as polyethylene terephthalate; polybutylene terephthalate and polythylene naphthalate, polythioether such as polyphenyl sulfide, polyamide, polycarbonate, polyarylate, polysulfone, polyetheretherketone, polyether sulfone, polyimide, polyamide-imide, poly(methyl methacrylate), ethylene/acrylic acid copolymer, acrylonitrile/styrene copolymer, acrylonitrile/chlorinated polyethylene/styrene copolymer, ethylene/vinyl acetate copoymer, ethylene/vinyl alcohol copolymer, acrylonitrile/butadiene/styrene copolymer, vinyl chloride resin, chlorinated polyethylene, fluorinated polyethylene, polyacetal, thermoplastic urethane elastomer, 1,2-polybutadiene and styrene/maleic anhydride copolymer.

The styreneic resin composition according to the present invention can be prepared by blending the aforestated essential components and the additives to be used when desired each in a prescribed proportion and sufficiently kneading the blend at a proper temperature, for example, of 270° to 320° C. by the use of a single-screw extruder, twin screw extruder, cokneader, multi-screw extruder or the like.

The styrenic resin composition according to the present invention is a composition which has favorable release properties from a hot mold that are the conditions of promoting crystallization and which is greatly improved in impact resistance without losing the excellent heat resistance and high mechanical strength that are inherent in a styrenic resin having syndiotactic configuration, or is a composition which is gifted with excellent flame retardance in addition to the above-mentioned characteristics. Accordingly it is favorably used for general construction materials, electric and electronic parts and car parts and besides as raw materials for film, fiber, sheet, etc..

In the following the present invention will be described in more detail with reference to working examples, which however, shall not limit the present invention thereto.

In the examples, each of the characteristics was evaluated in the following manner.
(1) Release properties
ⓞ Particularly excellent ○ Good
X Somewhat inferior
XX Not moldable (2) Izod impact strength with or without notch determined according to JIS K-7110.
(3) Flexural modulus of elasticity determined according to JIS K-7203.
(4) Heat distortion temperature HDT (high or low) determined according to JIS K-7207.
(5) Vicat softening point determined according to JIS K-7206.
(6) Long-term heat resistance
(a) Retention of tensile strength, 150° C. × 500 hours
(b) Change in appearance, 180° C. × 500 hours
(c) Combustibility; UL 94 (1/32 inch)

Reference Example 1

In a 500 ml glass vessel which had been purged with argon were placed 200 ml of toluene, 17.8 g (71 mmol) of copper sulfate pentahydrate (CuSo$_4$.5H$_2$O) and 24 ml (250 mmol) of trimethylaluminum, which were then reacted at 40° C. for 8 hours. Then, the solids were separated from the reaction mixture and the toluene was distilled away from the solution as obtained above at room temperature under reduced pressure to obtain 6.7 g of a contact product. The molecular weight thereof as determined by the freezing point depression method was 610.

Preparation Example 1

In a 2 L (L=leter) reaction vessel were placed 1L of purified styrene, the contact product as obtained in the above Reference Example 1 in an amount of 7.5 mmol as aluminum atom, 7.5 mmol of triisobutylaluminum and 0.038 mmol of pentamethylcyclopentadienyl-titanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 466 g of polymer. As the result of analysis by gel permeation chromatography using 1,2,4-trichlorobenzene at 130° C. as the slovent, the polymer thus produced had a weight-average molecular weight of 290,000 and a ratio of weight-average molecular weight to number-average molecular weight of 2.72.

It was confirmed that the polymer was polystyrene having syndiotactic configuration (SPS) from the results of melting point measurement and $^{13}$C-NMR analysis.

Preparation Example 2

100 parts by weight of poly(2,6-dimethyl-1,4-phenylene) ehter (PPE) (produced by Aldrich Corp. Catalogue No. 18178-1), 3 parts by weight of maleic anhydride (grade S, produced by Wako Pure Chemical Industries Ltd.) and 0.2 part by weight of tert-butylhydroperoxide as the peroxide (produced by Nippon Oil & Fats Co., Ltd. under the tradename "PERBUTYL H") were mixed with a Henschel mixer. Subsequently the mixture was kneaded under heat-melting at 300° to 320° C. by means of a twin-screw extruder to afford maleic anhydride-modified PPE, which was dissolved in toluene and then added dropwise into methanol to purify the same by reprecipitation. The purified modified-PPE was press molded and the molding was observed for the peak assigned to carbonyl group by infrared (IR) analysis. As a result, the molding was confirmed to have been maleic anhydride-modified.

Preparation Example 3

100 parts by weight of styrene-grafted polyphenylene ether (PPE) having an intrinsic viscosity of 0.45 in chloroform at 25° C. (produced by Mitsubishi Gas Chemical Co., Inc. under the tradename "UPACE HPX 100L"), 0.5 part by weight of maleic anhydride (grade S, produced by Wako Pure Chemical Industries Ltd.) and 0.4 part by weight of cumenhydroperoxide as the peroxide (produced by Nippon Oli & Fats Co., Ltd. under the tradename "PERCUMYL H") were mixed with a Henschel mixer. Subsequently the mixture was kneaded under heat-melting at 300° C. by means of a twin-screw extruder to afford maleic anhydrid-modified PPE, which was confirmed to have been maleic anhydride-modified by the same procedure as in Preparation Example 2.

Examples 1 & 2 and Comparative Example 1

80 parts by weight of the polystyrene having syndiotactic configuration as obtained in Preparation Example 1 (PS component), 20 parts by weight of any of various rubbery polymers, 0.1 part by weight of (2,6-di-tert-butyl-4-methylphenyl)pentaerythritol diphosphite as an antioxidant (produced by Adeka Argus Co., Ltd. under the tradename "MARK PFP-36"), 0.1 part by weight of tetrakis-[methylene-3,5-di-tert-butyl-4-hydroxyhydrocinnamate)]methane (produced by Adeka Argus Co., Ltd. under the tradename "MARK AD 60") were dry blended with a Henschel mixer. Subsequently the mixture was pelletized by melt kneading with a twin-screw extruder having a cylinder temperature of 300° C. The pellet was injection molded to produce test pieces for testing Izod impact strength, flexural modulus of elasticity, Vicat Softening point and release properies. The test results are given in Table 1.

TABLE 1

|  |  |  | Example 1 | Example 2 | Comparative Example 1 |
|---|---|---|---|---|---|
| Blending ratio | | | | | |
| (A) | Preparation Example 1 SPS (parts by weight) | | 80 | 80 | 80 |
| (B) | Rubbery polymer (SEBS) | kind | G1651 | H1271 | G1652 |
| | | Mw × Cst | 43500 | 43500 | 13500 |
| | | amount (parts by weght) | 20 | 20 | 20 |
| Release property | | | ⊙ | ⊙ | X |
| General physical-properties | | | | | |
| Izot impact Strength with notch (kg cm/cm) | | | 8 | 8 | 6 |

TABLE 1-continued

|  | Example 1 | Example 2 | Comparative Example 1 |
|---|---|---|---|
| flexural modulus of elasticity (kg/cm) | 30,000 | 30,000 | 25,000 |
| Vicat softening point (°C.) | 240 | 240 | 207 |

Remarks:
G1651, G1652; Craton, produced by Shell Chem. Co., Ltd.
H1271; Toughtech, produced by Asahi Chemical Industry Co., Ltd.
Mw × Cst; (molecular weight) × (styrene unit content)

Examples 3 to 11 and Comparative Examples 2 to 4

The polystyrene having syndiotactic configuration as obtained in Preparation Example 1 (SPS), rubbery polymer as shown in Table 2, maleic anhydride-modified polyphenylene ether as obtained in Preparation Example 2 or 3 (MA-PPE), filler as shown in Table 2, in amounts as shown in Table 2, 0.1 part by weight of (2,6-di-tert-butyl-4-methylphenyl)pentaerythritol diphosphite as an antioxidant (produced by Adeka Argus Co., Ltd. under the tradename "MARK PEP-36"), 0.1 part by weight of tetrakis[methylene-3,5-di-tert-butyl-4-hydroxyhydrocinnamate)]methane (produced by Adeka Argus Co., Ltd. under the tradename "MARK AD 60") were dry blended with a Henschel mixer. Subsequently the mixture was pelletized with a twin-screw extruder having a cylinder temperature of 300° C. The pellet was injection molded to produce test pieces for testing Izod impact strength, flexural modulus of elasticity, heat distortion temperature and long-term heat resistsance. The results are given in Table 2.

TABLE 2-1

| | | Blending ratio | | | | | |
|---|---|---|---|---|---|---|---|
| | (A) Preparation Example 1 SPS (parts by weight) | (B) Rubbery polymer (SEBS) | | | (C) MA-PPE | | (D) filler | |
| | | kind | Mw × Cst | amount (parts by weight) | kind (Preparation Example No.) | amount (parts by weight) | kind | amount (parts by weight) |
| Example 3 | 80 | G1651 | 43500 | 20 | 2 | 1 | GF | 10 |
| Comparative Example 2 | 80 | G1652 | 13500 | 20 | 2 | 1 | GF | 10 |
| Example 4 | 95 | G1651 | 43500 | 5 | 3 | 3 | GF | 30 |
| Example 5 | 90 | G1651 | 43500 | 10 | 3 | 3 | GF | 30 |
| Example 6 | 80 | G1651 | 43500 | 20 | 2 | 2 | GF | 30 |
| Example 7 | 80 | H1271 | 43500 | 20 | 3 | 3 | GF | 10 |
| Example 8 | 80 | G1651 | 43500 | 20 | 3 | 3 | GF | 15 |
| Example 9 | 80 | G1651 | 43500 | 20 | 2 | 2 | GF | 5 |
| Comparative Example 3 | 100 | — | — | — | 2 | 2 | GF | 30 |
| Example 10 | 80 | G1651 | 43500 | 20 | 3 | 2.5 | Diblex | 100 |
| Example 11 | 80 | G1651 | 43500 | 20 | 3 | 2.5 | Tismo N101 | 100 |
| Comparative Example 4 | 80 | G1652 | 13500 | 20 | 3 | 2.5 | Tismo N101 | 100 |

Remarks:
GF; glass fiber surface-treated with aminosilane (ECS 03T-051/P, produced by Japan Electric Glass Co., Ltd.)
Diblex; potassium titanate whisker surface-treated with amino group-containing compound, produced by Kawatetsu Mining Co., Ltd.
Tismo N101; potassium titanate whisker surface-treated with aminosilane produced by Otsuka Chemical Co., Ltd.

TABLE 2-2

| | Release Property | Izot impact strength with notch (kg · cm/cm) | Flexural modulus of elasticity (kg/cm$^2$) | HDT (18.6 kg/cm$^2$) (C.°) | Long-term heat resistance (150° C. × 500 hr) retention of tensile strength (%) |
|---|---|---|---|---|---|
| Example 3 | ○ | 11.5 | 48,000 | 116 | 98 |
| Comparative Example 2 | XX | | not moldable | | |
| Example 4 | ○ | 10.0 | 101,000 | 243 | 77 |
| Example 5 | ○ | 11.5 | 96,000 | 238 | 83 |
| Example 6 | ○ | 14.0 | 92,000 | 224 | 97 |
| Example 7 | ○ | 11.5 | 48,000 | 116 | 98 |
| Example 8 | ○ | 13.0 | 52,000 | 148 | 98 |
| Example 9 | ○ | 10.5 | 40,000 | 102 | 98 |
| Comparative Example 3 | X | 9.0 | 100,000 | 248 | 57 |

TABLE 2-3

| | | General physical-properties | | | | |
|---|---|---|---|---|---|---|
| | Release Property | Izot impact strength without notch (kg · cm/cm) | Flexural modulus of elasticity (kg/cm$^2$) | HDT (4.6 kg/cm$^2$) (C.°) | Long-term heat resistance (180° C. × 500 hr) | |
| | | | | | color change | cracking |
| Example 10 | ○ | 30.0 | 103,000 | 203 | slight | none |
| Example 11 | ○ | 30.0 | 100,000 | 211 | moderate | none |
| Comparative | XX | | not moldable | | | |

TABLE 2-3-continued

|  | | General physical-properties | | | |
|---|---|---|---|---|---|
|  | Release Property | Izot impact strength without notch (kg · cm/cm) | Flexural modulus of elasticity (kg/cm$^2$) | HDT (4.6 kg/cm$^2$) (C.°) | Long-term heat resistance (180° C. × 500 hr) |
|  |  |  |  |  | color change    cracking |
| Example 2 | | | | | |

Examples 12 to 16 and Comparative Examples 5 & 6

The polystyrene having syndiotactic configuration as obtained in Preparation Example 1 (SPS), rubbery polymer as shown in Table 3, maleic anhydride-modified polyphenylene ether as obtained in Preparation Example 2 or 3 (MA-PPE), glass fiber (produced by Japan Electric Glass Co., Ltd. under the tradename "ECS 03T-051/P", surface-treated with aminosilane), flame retardant (produced by Nissan Ferro Organic Chemical Co., Ltd. under the tradename "PYROTIC 68 PB") flame retardant aid (produced by Nippon Seiko Co., Ltd. under the tradename "ATOX-S", antimony trioxide) in amounts as shown in Table 3, 0.1 part by weight of (2,6 di-tert-butyl-4-methylphenyl)pentaerythritol diphosphite as an antioxidant (produced by Adeka Argus Co., Ltd. under the tradename "MARK PEP-36"), 0.1 part by weight of tetrakis [methylene-(3,5-di-tert-butyl-4-hydroxyhydrocinnamate)]methane (produced by Adeka Argus Co., Ltd. under the tradename "MARK A 60") were dry blended with a Henschel mixer. Subsequently the mixture was pelletized with a twins-crew extruder having a cylinder temperature of 300° C. The pellet was injection molded to produce test pieces for testing Izod impact strength, flexural modulus of elasticity, heat distortion temperature, combustibility, long-term thermal-stability and release properties. The test results are given in Table 3.

INDUSTRIAL APPLICABILITY

The styrenic resin composition according to the present invention is a composition which has favoragle release properties from a hot mold that are the conditions of promoting crystallization and which is greatly improved in impact resistance without losing the excellent heat resistance and high mechanical strength that are inherent in a styrenic resin having syndiotactic configuration, or is a composition which is gifted with excellent flame retardance in addition to the above-mentioned characteristics. Accordingly it is favorably used for general construction materials, electric and electronic parts and car parts and besides as raw materials for film, fiber, sheet, etc.

We claim:

1. A styrenic resin composition which comprises 50 to 98% by weight, based on the total weight of components (A) and (B), of (A) a styrenic polymer having high degree of syndiotactic configuration and 50 to 2% by weight, based on the total weight of components (A) and (B), of (B) a rubbery polymer having a product of weight-average molecular weight and styrenic monomer unit content of at least 30,000.

2. A styrenic resin composition which comprises (i) 100 parts by weight, based on the total weight of the composition, of a mixture of 50 to 98% by weight, based on the total weight of components (A) and (B), of (A) a styrenic polymer having high degree of syndiotactic configuration and 50 to 2% by weight, based on the

TABLE 3-1

| | (A) Preparation Example 1 SPS (parts by weight) | (B) Rubbery polymer (SEBS) | | | (C) MA-PPE | | (D) GF amount (parts by weight) | (E) pyrotic 68PB | (F) antimony trioxide |
|---|---|---|---|---|---|---|---|---|---|
| | | | | Blending ratio | | | | | |
| | | kind | Mw × Cst | amount (parts by weight) | kind | amount (parts by weight) | | | |
| Example 12 | 90 | G1651 | 43500 | 10 | 3 | 3 | 30 | 29 | 4 |
| Example 13 | 90 | G1651 | 43500 | 10 | 3 | 3 | 30 | 25 | 4 |
| Example 14 | 85 | G1651 | 43500 | 15 | 3 | 3 | 30 | 32 | 4 |
| Example 15 | 80 | G1651 | 43500 | 20 | 2 | 3 | 30 | 28 | 4 |
| Example 16 | 75 | G1651 | 43500 | 25 | 3 | 3 | 30 | 30 | 4 |
| Comparative Example 5 | 90 | G1652 | 13500 | 10 | 3 | 3 | 30 | 25 | 4 |
| Comparative Example 6 | 100 | — | — | — | 2 | 3 | 30 | 25 | 2 | styrenic polymer having high degree of syndiotactic configuration and 50 to 2% by weight, based on the

TABLE 3-2

| | Release Property | Izot impact strength with notch (kg · cm/cm) | Flexural modulus of elasticity (kg/cm$^2$) | HDT (high) (C.°) | HDT (low) (C.°) | Combustibility UL94 (1/32 inch) | Long-term heat resistance (150° C. × 500 hr) retention of tensile strength (%) |
|---|---|---|---|---|---|---|---|
| | | | General physical-properties | | | | |
| Example 12 | ○ | 6.0 | 110,000 | 223 | 264 | V-0 | 83 |
| Example 13 | ○ | 5.0 | 110,000 | 223 | 264 | V-2 | 83 |
| Example 14 | ○ | 6.0 | 100,000 | 207 | 263 | V-0 | 88 |
| Example 15 | ○ | 6.5 | 105,000 | 200 | 262 | V-2 | 98 |
| Example 16 | ○ | 7.0 | 105,000 | 190 | 261 | V-2 | 99 |
| Comparative Example 5 | XX | | | not moldable | | | |
| Comparative Example 6 | X | 5.0 | 115,000 | 228 | 266 | V-2 | 74 | total weight of components (A) and (B), of (B) a rubbery polymer having a product of weight-average molecular weight and styrenic monomer unit content of at least 30,000, (ii) 0.1 to 50 parts by weight, based on the total weight of the composition, of (C) a polyphenylene ether having a polar group and (iii) 1 to 350 parts by weight, based on the total weight of the composition, of (D) a filler surface-treated with a coupling agent.

3. A styrenic resin composition which comprises (i) 100 parts by weight, based on the total weight of the composition, of a mixture of 50 to 98% by weight, based on the total weight of components (A) and (B), of (A) styrenic polymer having high degree of syndiotactic configuration and 50 to 2% by weight, based on the total weight of components (A) and (B), of (B) a rubbery polymer having a product of weight-average molecular weight and styrenic monomer unit content of at least 30,000, (ii) 0.1 to 50 parts by weight, based on the total weight of the composition, of (C) a polyphenylene ether having a polar group, (iii) 1 to 350 parts by weight, based on the total weight of the composition, of (D) a filler surface-treated with a coupling agent, (iv) 3 to 60 parts by weight, based on the total weight of the composition, of (E) a flame retardant and (v) 1 to 15 parts by weight, based on the total weight of the composition, of (F) a flame retardant aid.

4. The styrenic resin composition as set forth in any of the claims 1 to 3 wherein the rubbery polymer as the component (B) has a product of weight average molecular weight and styrenic monomer unit content of at least 40,000.

5. The styrenic resin composition as set forth in any of the claims 1 to 3 wherein the rubbery polymer as the component (B) has a product of weight-average molecular weight and styrenic monomer unit content of at least 30,000 and is a styrene/butadiene block copolymer rubber in which the butadiene moiety is hydrogenated in part or in whole.

6. The styrenic resin composition as set forth in any of the claims 1 to 3 wherein the rubbery polymer as the component (B) is styrene/butadiene block copolymer rubber, styrene/butadiene block copolymer rubber in which the butadiene moiety is hydrogenated in part on in whole, styrene/butadiene copolymer rubber, methyl acrylate/butadiene/styrene copolymer rubber, acrylonitrile/butadiene/styrene copolymer rubber, or methyl acrylate/acrylic acid/2-ethylhexyl-styrene copolymer rubber.

7. The styrenic resin composition as set forth in any of the claims 1 to 3 wherein said styrenic polymer as the component (A) has a syndiotacticity of at least 85% expressed in terms of the proportion of racemic diad or of at least least 35% expressed in terms of the proportion of racemic pentad.

8. The styrenic resin composition as set forth in claim 2 or 3 wherein the polar group in the polyphenylene ether as the component (C) is an acid halide, a carbonyl group, an acid anhydride, an acid amide, a carbonic acid ester, an acid azide, a sulfone group, a nitrile group, a cyano group, an isocyanic acid ester group, an amino group, a hydroxyl group, an imide group, a thiol group, an oxazoline group or an epoxy group.

9. The styrenic resin composition as set forth in claim 2 or 3 wherein the content of the polar group in the polyphenylene ether as the component (C) is at least 0.01% by weight based on the total weight of said polyphenylene ether.

10. The styrenic resin composition as set forth in claim 3 wherein the flame retardant as the component (E) is a halogen-based or phosphorus-based flame retardant.

11. The styrenic resin composition as set forth in claim 3 wherein the flame retardant aid as the component (F) is antimony trioxide, antimony pentaoxide, sodium antimonate, metallic antimony, antimony trichloride, antimony pentachloride, antimony trisulfide, antimony pentasulfide, zinc borate, barium methaborate or zirconium oxide.

* * * * *